United States Patent [19]

Ban

[11] Patent Number: 4,643,078
[45] Date of Patent: Feb. 17, 1987

[54] FIBER-REINFORCED LIGHTWEIGHT ALLOY PISTON FOR AN INTERNAL-COMBUSTION ENGINE AND ASSOCIATED METHOD

[75] Inventor: Keisuki Ban, Fujimi, Japan

[73] Assignee: Honda Giken Kogyo Kabushiki Kaisha, Tokyo, Japan

[21] Appl. No.: 608,138

[22] Filed: May 8, 1984

[30] Foreign Application Priority Data

May 26, 1983 [JP] Japan ................................. 58-93063

[51] Int. Cl.$^4$ .......................................... B23P 15/10
[52] U.S. Cl. ....................................... 92/212; 92/213; 92/222; 92/224; 92/248; 123/193 P
[58] Field of Search ................. 92/213, 248, 212, 222, 92/224; 123/193 P; 423/625; 428/610, 614; 501/95

[56] References Cited

U.S. PATENT DOCUMENTS

| | | | |
|---|---|---|---|
| 2,239,530 | 4/1941 | Langenohl et al. | 501/95 |
| 3,808,015 | 4/1974 | Seufert | 501/95 |
| 3,982,955 | 9/1976 | Mansmann et al. | 501/95 |
| 4,364,159 | 12/1982 | Holcombe | 92/222 |
| 4,498,219 | 2/1985 | Ban et al. | 92/213 |

OTHER PUBLICATIONS

J. W. Newsome et al., Alumina Properties, Technical Paper #10, pp. 22, 34 & 35, 1960, Alcoa.

Primary Examiner—Edward K. Look
Assistant Examiner—John M. Husar
Attorney, Agent, or Firm—Roberts, Spiecens & Cohen

[57] ABSTRACT

A fiber-reinforced lighweight alloy piston for an internal-combustion engine, comprising a piston body having a compression ring groove whose bounding surface is reinforced with alumina fibers. At least those alumina fibers positioned in the region of the annular opening of the groove has a crystalline structure of $\theta/\alpha\text{-Al}_2\text{O}_3$ type and a specific gravity limited to a value between 3.7 and 3.9.

9 Claims, 5 Drawing Figures

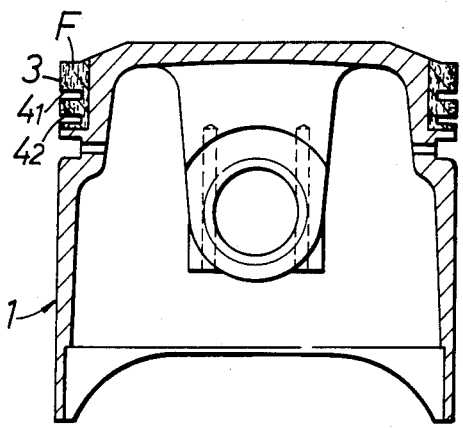
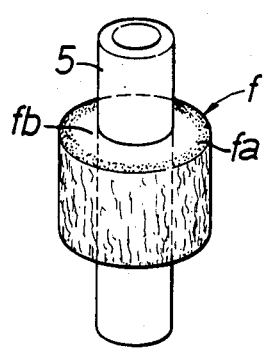
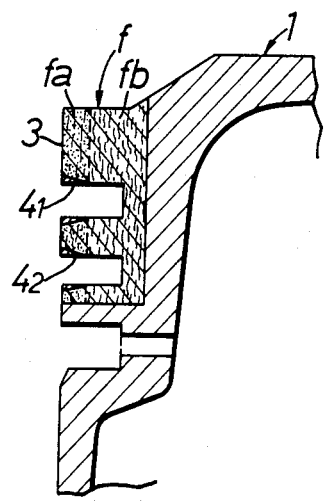

FIBER-REINFORCED LIGHTWEIGHT ALLOY PISTON FOR AN INTERNAL-COMBUSTION ENGINE AND ASSOCIATED METHOD

FIELD OF THE INVENTION

This invention relates to a fiber-reinforced, lightweight, alloy piston for an internal-combustion engine and to its method of reinforcement.

PRIOR ART

Heretofore, pistons of this sort have been produced in which the inner surfaces of the compression ring grooves are reinforced with alumina fibers to improve the hot-wear resistance of the compression ring grooves.

The crystalline structures of alumina fibers differ according to the manufacturing process, pyrolysis treatments, etc., thereof, and various types are known such as the $\gamma/\delta$-$Al_2O_3$ type, $\delta/\theta$-$Al_2O_3$ type, $\theta/\alpha$-$Al_2O_3$ type, $\delta/\alpha$-$Al_2O_3$ type etc.

SUMMARY OF THE INVENTION

The inventors have reinforced the inner surfaces of compression ring grooves of lightweight alloy pistons with alumina fibers having such crystalline structures as mentioned above and have examined these lightweight alloy pistons. As a result, they have found that not all the alumina fibers with the above crystalline structures are effective in improving the wear resistance at high temperatures, but rather that only those alumina fibers with certain crystalline structures and specific gravities are effective.

This invention was devised from these findings and has as its object the provision of a lightweight alloy piston whose compression ring grooves have a greatly improved hot-wear resistance, characterized in that the part of the alumina fibers positioned at least in the region of the openings of the compression ring grooves has a crystalline structure of $\theta/\alpha$-$Al_2O_3$ type, and their specific gravity is selected to be between 3.7–3.9.

An embodiment of the invention will now be described with reference to the accompanying drawings.

BRIEF DESCRIPTION OF THE DRAWINGS

FIG. 1 is a longitudinal sectional view of a first embodiment of this invention.

FIG. 4 is a perspective view illustrating the process of heat-treating a fiber-shaped body.

FIG. 5 is a longitudinal section, on enlarged scale, of part of a second embodiment of this invention.

DETAILED DESCRIPTION OF PREFERRED EMBODIMENTS

Referring first to FIG. 1, therein is seen a lightweight alloy piston 1 reinforced with alumina fibers and having a land 3 and first and second compression ring grooves $4_1$, $4_2$. In this embodiment, the crystalline structure of all the alumina fibers in the fiber-reinforced part F is of the $\theta/\alpha$-$Al_2O_3$ type, and the specific gravity thereof is between 3.7–3.9.

Of the alumina fibers shown in the following table, alumina fibers IV and V are used in this invention, the other fibers I–III are cited for comparison.

| Alumina fiber | Crystalline structure | Crystallization ratio (%) | Specific gravity | $\alpha$-$Al_2O_3$ content (wt %) |
|---|---|---|---|---|
| I | $\gamma/\delta$-$Al_2O_3$ | 75 | 3.2 | 4 |
| II | $\delta/\theta$-$Al_2O_3$ | 79 | 3.3 | 7 |
| III | $\theta/\alpha$-$Al_2O_3$ | 89 | 3.6 | 18 |
| IV | $\theta/\alpha$-$Al_2O_3$ | 92 | 3.7 | 20 |
| V | $\theta/\alpha$-$Al_2O_3$ | 97 | 3.9 | 30 |
| VI | $\delta/\alpha$-$Al_2O_3$ | approx. 100 | 4.0 | approx. 100 |

Figure 2:
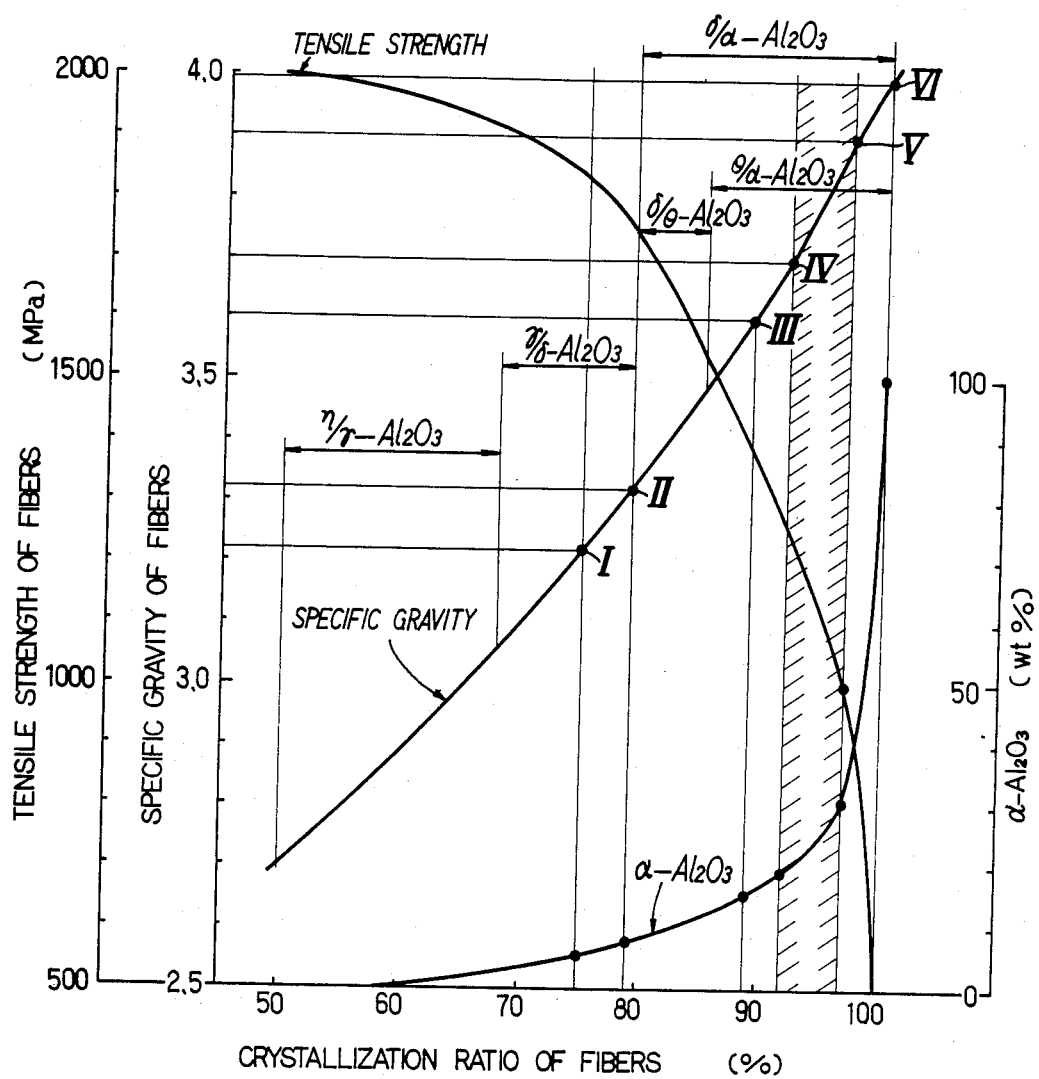
FIG. 2 is a graph of the relationships of specific gravity, tensile strength, and $\alpha$-$Al_2O_3$ content with respect to the crystallization ratios of alumina fibers.

FIG. 2 shows the relationships of specific gravity, tensile strength and $\alpha$-$Al_2O_3$ content with respect to crystallization ratio for alumina fibers I–VI, the hatched part of the graph showing the range of alumina fibers IV and V used in this invention.

Lightweight alloy pistons $P_4$ and $P_5$ using alumina fibers IV and V of the present invention, and lightweight alloy pistons $P_1$–$P_3$ and $P_6$ using the other alumina fibers I–III and VI were manufactured and compared with one another. Each piston $P_1$–$P_6$ was manufactured by high pressure solidification casting after the corresponding alumina fibers I–VI were formed into cylindrical fiber bodies with an outer diameter of 74 mm, an inner diameter of 56 mm, a length of 13 mm, and a bulk density of 0.15 g/cc, and then placed in the cavity of a mold, using aluminum alloy (JIS AC8B material) as a matrix.

Figure 3:
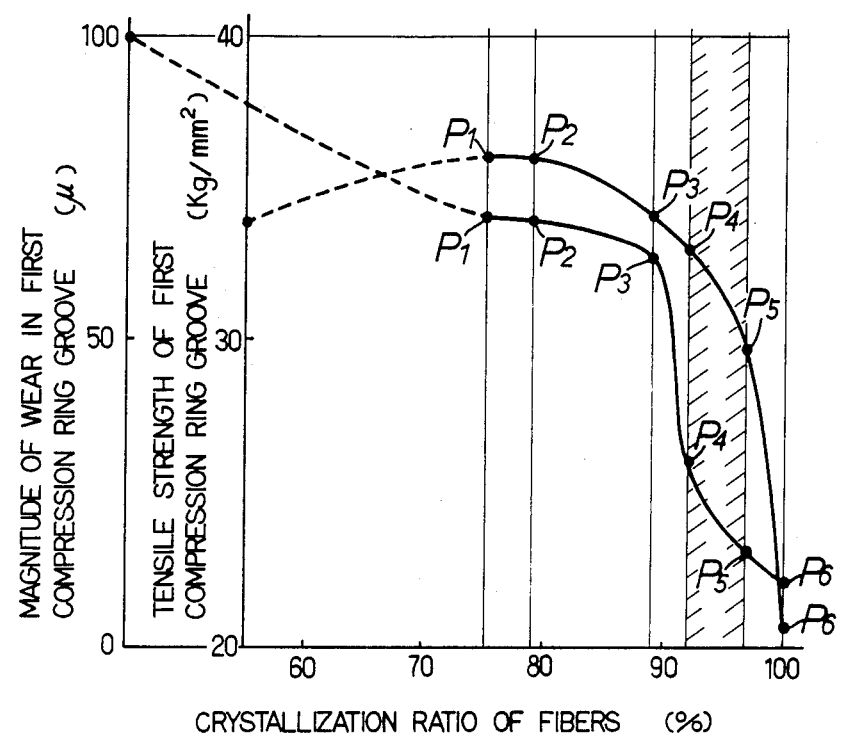
FIG. 3 is a graph of the relationships of magnitude of wear and tensile strength with respect to crystalline ratios in the first compression ring grooves of fiber-reinforced lightweight alloy pistons.

FIG. 3 shows the relationships of tensile strength and magnitude of wear after endurance bench tests with respect to the crystallization ratio of the alumina fibers in the first compression ring groove $4_1$ of each lightweight alloy piston $P_1$–$P_6$, the hatched part showing the range of the present invention. The endurance bench tests were conducted by driving each of 1.2 l engines with the pistons $P_1$–$P_6$ mounted therein, using leaded gasoline at a full load of 5,000 rpm. for 400 hours.

It is clear from FIG. 3 that in the compression ring grooves $4_1$ of the pistons $P_4$ and $P_5$ which relate to this invention, i.e., the pistons using alumina fibers IV and V having a $\theta/\alpha$-$Al_2O_3$ crystalline structure, a crystallization ratio of 92–97%, a specific gravity of 3.7–3.9 and an $\alpha$-$Al_2O_3$ content of 20–30wt%, the magnitude of wear was extremely small, and their tensile strength was high.

It was confirmed that alumina fibers IV and V with a $\theta/\alpha$-$Al_2O_3$ crystalline structure and a specific gravity more than 3.9, that is, if their crystallization ratio is more than 97%, the content of hard, brittle $\alpha$-$Al_2O_3$ increases, and consequently the magnitude of wear in the first compression ring groove $4_1$ is reduced, but the tensile strength thereof abruptly decreases, which leads to damage to the opening of the first compression ring groove $4_1$. It was also confirmed that if the specific gravity is below 3.7, that is, if the crystallization ratio is below 92%, the tensile strength of the first compression ring groove $4_1$ increases, but the $\alpha$-$Al_2O_3$ content decreases, as shown by the lightweight alloy piston $P_3$ of FIG. 3, therefore, the magnitude of wear increases rapidly.

For the lightweight alloy pistons $P_1$, $P_2$ and $P_6$ cited for comparison, it was found that either the magnitude of wear or the tensile strength does not satisfy the values required for lightweight alloy pistons, because of differences in crystalline structure and specific gravity, i.e., the crystallization ratio.

The alumina fibers IV and V used in this invention were modified alumina fibers produced by heat-treating conventional fibers. Conventional alumina fibers are produced by spinning them at comparatively low temperatures with use of various salts and solvents, crystallizing them by pyrolysis treatment, and then adjusting the crystalline grains, crystallization ratio and $\alpha$-$Al_2O_3$ content to, for example, a specific gravity of 3.2–3.7, a crystallization ratio of 75–92%, and an $\alpha$-$Al_2O_3$ content of 4–20 wt%.

In order to modify the mentioned conventional alumina fibers, two processes can be used. One is a process of heat-treating a blanket-shaped material, and the other is a process of externally heating a cylindrical shaped body f inserted into a mandrel 5, as shown in FIG. 4. In the former case, all the material is modified substantially uniformly, so that a cylindrical body molded therefrom can reinforce the land 3 and the entire inner surfaces of the compression ring grooves $4_1$ and $4_2$ of the lightweight alloy piston of FIG. 1, like the foregoing embodiment.

On the other hand, in the latter case it is difficult to uniformly heat the entirety of the shaped body f. As a result, the outer peripheral part fa is completely modified, but the inner peripheral part fb is not sufficiently modified. However, in lightweight alloy pistons, it is the openings of the first and second compression ring grooves $4_1$ and $4_2$ at which hot-wear resistance is important. Accordingly, the shaped body f can be used for reinforcing the openings of the first and second compression ring grooves $4_1$ and $4_2$ at the outer peripheral part fa thereof.

As seen from the above, this invention provides a fiber-reinforced lightweight alloy piston wherein the hot-wear resistance at the opening of the compression ring grooves is greatly improved, by suitably composing the crystalline structure and specific gravity of the alumina fibers used in the opening part of the compression ring grooves.

What is claimed is:

1. A fiber reinforced lightweight alloy piston for an internal-combustion engine comprising a piston body of lightweight alloy provided with a compression ring groove having an inner surface, and a reinforcement means at said inner surface consisting of alumina fibers having a $\theta/\alpha$-$Al_2O_3$ crystalline structure with a specific gravity between 3.7 and 3.9, said alumina fibers further having a crystallization ratio of 92–97% and and an $\alpha$-$Al_2O_3$ content of 20–30 weight %.

2. A piston as claimed in claim 1 wherein said groove is annular and has an annular opening, said alumina fibers being disposed at least in the region of said opening of said groove.

3. A piston as claimed in claim 2 wherein said piston body includes a land bounding said groove, said land including an outer peripheral region, said alumina fibers being disposed in said land in said outer peripheral region thereof.

4. A piston as claimed in claim 3 wherein said alumina fibers are arranged in said land as an annular body.

5. In a fiber reinforced lightweight alloy piston for an internal-combustion engine comprising a piston body of lightweight alloy provided with a compression ring groove having an inner surface, and a reinforcement means at said inner surface constituted by alumina fibers, the improvement wherein said alumina fibers have a $\theta/\alpha$-$Al_2O_3$ crystalline structure and a specific gravity limited to 3.7 to 3.9, said alumina fibers further having a crystallization ratio of 92–97% and an $\alpha$-$Al_2O_3$ content of 20–30 weight %.

6. The improvement as claimed in claim 5 wherein said piston body includes a land bounding said groove, said land including an outer peripheral region, said alumina fibers being disposed in said land in said outer peripheral region thereof.

7. The improvement as claimed in claim 5 wherein said alumina fibers are arranged in said land as an annular body.

8. In a method of reinforcing a lightweight alloy piston for an internal combustion engine wherein alumina fibers are disposed in the piston at the bounding surface of an annular compression groove of the piston, the improvement comprising selecting the fibers at least in the region of the piston at the annular opening of the groove to have a $\theta/\alpha$-$Al_2O_3$ crystalline structure with a specific gravity limited to a value between 3.7 and 3.9 and a crystallization ratio of 92–97% and an $\alpha$-$Al_2O_3$ content of 20–30 weight %.

9. The method as claimed in claim 8 wherein the alumina fibers are formed as an annular body and integrated with the lightweight alloy of the piston.

* * * * *

UNITED STATES PATENT AND TRADEMARK OFFICE
CERTIFICATE OF CORRECTION

PATENT NO. : 4,643,078
DATED : February 17, 1987
INVENTOR(S) : Keisuke Ban

It is certified that error appears in the above-identified patent and that said Letters Patent is hereby corrected as shown below:

On the title page inventor's name "Keisuki Ban" should read -- Keisuke Ban --.

Signed and Sealed this

Eighteenth Day of August, 1987

Attest:

DONALD J. QUIGG

*Attesting Officer*   *Commissioner of Patents and Trademarks*